(12) United States Patent
Soliman

(10) Patent No.: US 10,545,503 B2
(45) Date of Patent: Jan. 28, 2020

(54) PROPULSION EFFICIENT AUTONOMOUS DRIVING STRATEGY

(71) Applicant: Continental Automotive Systems, Inc., Auburn Hills, MI (US)

(72) Inventor: Ihab Soliman, Washington, MI (US)

(73) Assignee: Continental Automotive Systems, Inc., Auburn Hills, MI (US)

(*) Notice: Subject to any disclaimer, the term of this patent is extended or adjusted under 35 U.S.C. 154(b) by 157 days.

(21) Appl. No.: 15/843,470

(22) Filed: Dec. 15, 2017

(65) Prior Publication Data

US 2019/0004526 A1    Jan. 3, 2019

Related U.S. Application Data

(60) Provisional application No. 62/526,685, filed on Jun. 29, 2017.

(51) Int. Cl.
G05D 1/02 (2006.01)
G05D 1/00 (2006.01)
B62D 15/02 (2006.01)
B60W 30/00 (2006.01)

(52) U.S. Cl.
CPC ........... *G05D 1/0217* (2013.01); *B60W 30/00* (2013.01); *B62D 15/025* (2013.01); *B62D 15/0255* (2013.01); *B62D 15/0265* (2013.01); *G05D 1/0005* (2013.01); *G05D 2201/0213* (2013.01)

(58) Field of Classification Search
CPC .............. G05D 1/0217; G05D 1/0005; G05D 2201/0213; B60W 30/00; B62D 15/025; B62D 15/0255; B62D 15/0265
See application file for complete search history.

(56) References Cited

U.S. PATENT DOCUMENTS

2004/0068352 A1* 4/2004 Anderson ............ A01B 69/008
                                                    701/25
2016/0349751 A1* 12/2016 Sugimoto ............ G05D 1/0223

* cited by examiner

*Primary Examiner* — Aaron L Troost

(57) ABSTRACT

An efficiency autonomous driving strategy which accounts for the propulsion system efficiency and energy consumption during vehicle motion planning function required for autonomous driving. Specifically, a control algorithm calculates the required energy and total efficiency for various possible vehicle path/motion plans being considered by the autonomous driving (AD) controller. Given at least one or more desired vehicle motion plans, the propulsion system selects the vehicle motion path with the highest efficiency and least energy consumption. The control algorithm accounts for the current vehicle motion (speed/acceleration, etc.), and future vehicle motion requirements for a given vehicle path plan. The control algorithm calculates the total vehicle energy required (current time up to future time) for the proposed vehicle motion plans, then recommends the most efficient vehicle motion plan to the AD controller such that total energy consumption is reduced.

26 Claims, 6 Drawing Sheets

PROPULSION EFFICIENT AUTONOMOUS DRIVING STRATEGY

CROSS-REFERENCE TO RELATED APPLICATIONS

This application claims the benefit of Provisional Application 62/526,685, filed Jun. 29, 2017. The disclosure of the above application is incorporated herein by reference.

FIELD OF THE INVENTION

The invention relates generally to a strategy which accounts for the efficiency of various powertrain components during the vehicle path planning function both before and as a vehicle performs an autonomous driving maneuver.

BACKGROUND OF THE INVENTION

Current autonomous driving path planning interface between an autonomous driving controller and a powertrain controller is a simple powertrain torque (or vehicle longitudinal acceleration/deceleration request) at a current point in time. This is a similar type of interface to the powertrain controller as compared to a cruise control system, and may lead to inefficient vehicle path planning if the vehicle path planning does not take into consideration the efficiency of the powertrain components, such as traction drive, high voltage energy storage system, thermal management, or (in the case of a conventional powertrain system) the internal combustion engine, etc. Typical autonomous vehicle path planning algorithms output a target vehicle acceleration (or wheel torque) request during the autonomous driving maneuver at the current vehicle operating state without inputs for current or future (or predictive) knowledge of the efficiency of the powertrain components for the desired vehicle trajectory.

Accordingly, there exists a need for a strategy for predicting the efficiency of various powertrain components, and optimize the autonomous driving path of the vehicle based on the efficiency of the powertrain components, where there is an optimized powertrain control strategy for acceleration/deceleration control of a fully autonomous or semi-autonomous driving vehicle.

SUMMARY OF THE INVENTION

The present invention is a strategy which accounts for the propulsion system efficiency during the vehicle motion planning function required for autonomous driving at both the current operating point, and the desired future vehicle trajectory. A control algorithm calculates the required energy and total efficiency for various possible vehicle trajectory/motion plans being considered by the autonomous driving (AD) controller. Given at least one or more desired vehicle trajectories, the propulsion system selects the vehicle trajectory with the highest efficiency and least energy consumption. The control algorithm accounts for the current vehicle motion (speed/acceleration, wheel torque, etc.), and future vehicle motion requirements for a given vehicle trajectory. The control algorithm calculates the total vehicle energy required (current time up to future time) for the proposed vehicle trajectories, then recommends the most efficient vehicle trajectory to the AD controller.

For a given proposed vehicle trajectory (for both the current time and a future time), the control algorithm calculates energy consumption/losses (and accounts for efficiencies and energy requirements) for various subsystems at the corresponding operating points for the traction drive, high voltage battery, transmission/driveline, and thermal management systems for a given vehicle motion path. In the case of a conventional or hybrid powertrain incorporating an internal combustion engine, the corresponding operating points and BSFC (brake specific fuel consumption) is also calculated. The combined energy/total system efficiency is accounted for when calculating energy consumption and total efficiency for each of the proposed vehicle trajectories. The algorithm may be applied for use with battery electric vehicles, full hybrid electric vehicles, plug-in hybrid electric vehicles, or vehicle having a conventional powertrain with an autonomous driving control capability. The algorithm may be further expanded with the use of vehicle connectivity using static road profile data as well as dynamic data (e.g. traffic light, traffic volume, etc.).

The propulsion system efficiency strategy of the present invention is for an electric vehicle application, but may easily be expanded to a hybrid or conventional propulsion system application (i.e., different propulsion subsystems and actuators).

Typical autonomous driving controllers for autonomous driving applications do not select or alter a desired vehicle motion path plan based on the vehicle propulsion system efficiency or energy requirements. The vehicle motion plan is based on a vehicle environmental model derived from onboard sensors without consideration of the propulsion system's energy efficiency. Typical autonomous driving controlling strategies may lead to highly energy inefficient operation of the vehicle propulsion system depending on the driving maneuver and vehicle motion planned with respect to vehicle speed and acceleration and deceleration trajectory during the maneuver. The control strategy of the proposed invention addresses this by introducing a combined optimization approach in which an energy efficient vehicle motion plan is used for autonomous driving. In addition to battery electric or hybrid electric vehicles this concept may be expanded to non-electrified powertrains (conventional) as well.

In an alternate embodiment, the algorithm may include functionality for a direct vehicle trajectory and optimized speed within upper and lower limits of a desired vehicle trajectory boundary provided by the autonomous driving controller.

In one embodiment, the present invention is a system having an efficient autonomous driving strategy for a vehicle. The vehicle has an autonomous driving controller operable for configuring the vehicle to perform at least one autonomous driving maneuver. The autonomous driving controller is also operable for configuring the vehicle to perform the autonomous driving maneuver using one of a plurality of vehicle trajectories. The vehicle includes at least one powertrain component, and an efficient propulsion path planning function in electrical communication with the autonomous driving controller and the powertrain component. The efficient propulsion path planning function is operable for calculating the energy consumption of the at least one powertrain component corresponding to each of the vehicle trajectories.

The autonomous driving controller configures the vehicle to perform the autonomous driving maneuver using one of the vehicle trajectories corresponding to the most energy efficient use of the powertrain component.

In one embodiment, the autonomous driving controller calculates each of the possible vehicle trajectories at the current time, and the autonomous driving controller calculates each of the possible vehicle trajectories at least one future time. The autonomous driving controller then selects one of the plurality of vehicle trajectories to perform the autonomous driving maneuver which corresponds to the powertrain component operating using the least amount of energy at both the current time and the future time.

In an embodiment, the propulsion system efficient autonomous driving strategy of the present invention includes a first plurality of data points, where one or more of the plurality of data points represents the efficiency of the powertrain component at the current time, and another of the data points represents the efficiency of the powertrain component at the future time. The autonomous driving controller configures the vehicle to perform the autonomous driving maneuver using the powertrain component based on the plurality of data points at both the current time and the at least one future time.

In one embodiment, the efficiency of the powertrain component is recalculated by the efficient propulsion path planning function as the vehicle performs the at least one autonomous driving maneuver, such that the vehicle trajectory is altered during the autonomous driving maneuver to maximize the efficiency of the powertrain component.

The propulsion system efficient autonomous driving strategy also includes a vehicle environmental model, and each of the plurality of vehicle trajectories is calculated using the vehicle environmental model.

The vehicle includes a plurality of sensors in electrical communication with the autonomous driving controller, where the sensors detect information regarding the environment and objects around the vehicle. The vehicle also includes sensor fusion vehicle environmental model software in electrical communication with the autonomous driving controller. The vehicle environmental model is generated by the sensor fusion vehicle environmental model software based on information received from the plurality of sensors.

In one embodiment, the system having an efficient autonomous driving strategy includes at least one device for generating road data, and the vehicle environmental model is generated by the sensor fusion vehicle environmental model software based on the road data and information received from the plurality of sensors.

In one embodiment, the vehicle includes at least one battery, and one of the plurality of vehicle trajectories is selected to perform the autonomous driving maneuver based on the powertrain component using the lowest energy consumption from the battery.

The powertrain component may be any type of powertrain component used for providing propulsion of the vehicle. The powertrain component may be one of, but not limited to, a drive actuator, a traction drive motor, or an internal combustion engine. Furthermore, in the embodiment which incorporates an internal combustion engine, the internal combustion engine may be coupled with automatic multi-speed transmission with various gears, or an additional driveline component such as a transfer gearbox case for provide all-wheel drive capability, etc. In yet another alternate embodiment, such as a hybrid electric vehicle, the powertrain component may be a combination of an electric traction drive system and internal combustion engine capable of providing vehicle propulsion or vehicle braking force through at least one drive axle and wheels. The hybrid electric vehicle powertrain system may also include multiple propulsion operating modes to provide series or parallel operation such that both electric traction drive and internal combustion may simultaneously provide vehicle propulsion or braking force.

In one embodiment, the vehicle includes a brake control system in electrical communication with the efficient propulsion path planning function. The calculated efficiency of the powertrain component corresponding to each of the vehicle trajectories is further optimized based on the operation of the brake control system.

In one embodiment, the vehicle includes a powertrain controller, and the efficient propulsion path planning function is performed by the powertrain controller.

In one embodiment, the each of the plurality of vehicle trajectories is expressed as a function of time and speed. However, it is within the scope of the invention that the vehicle trajectories may be expressed as other functions as well, such as, but not limited to, time and acceleration, or time and torque.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
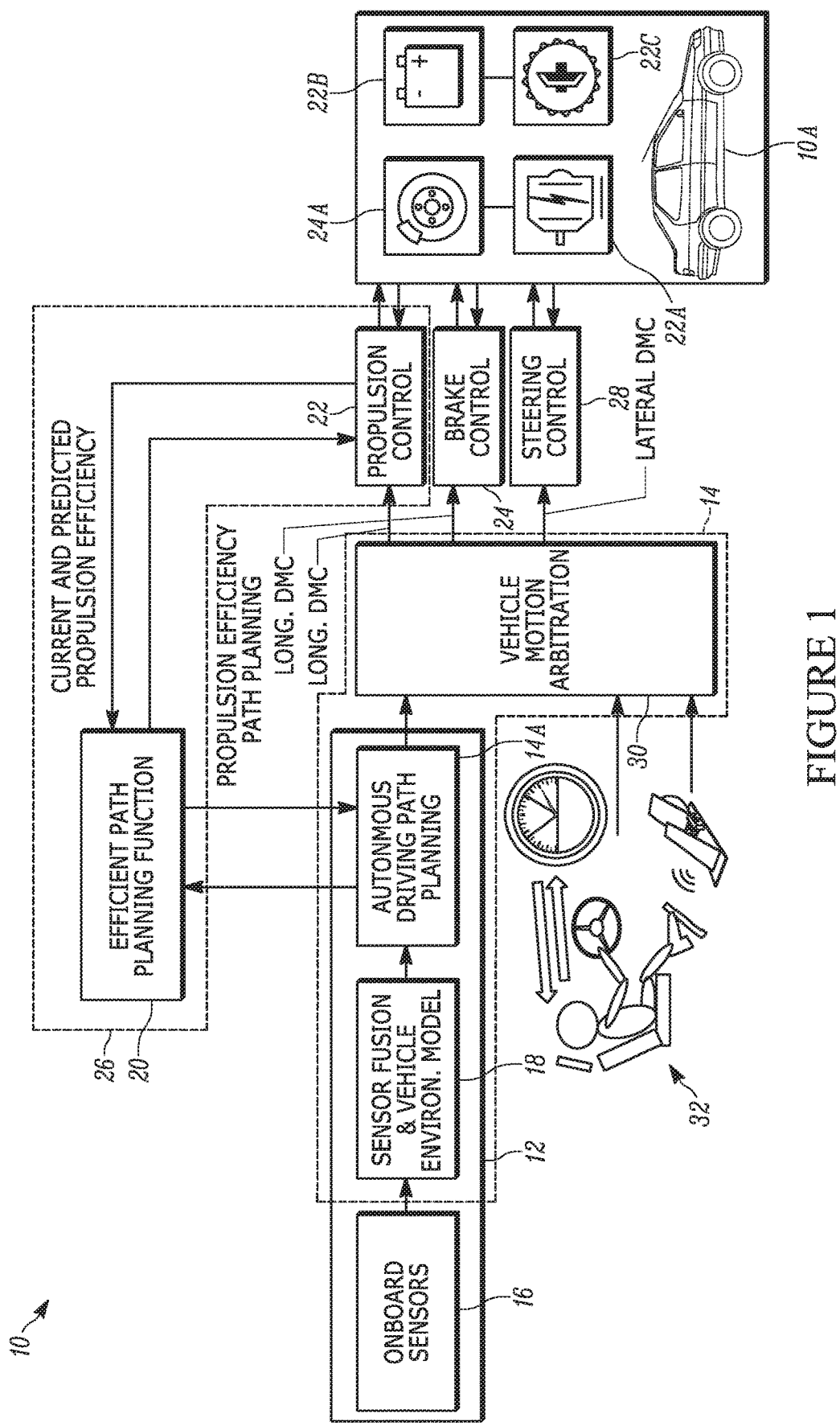
FIG. 1 is a diagram representing an autonomous driving system which includes an efficient autonomous driving strategy, according to embodiments of the present invention.

A diagram representing a system incorporating an efficient autonomous driving strategy according to the present invention for a vehicle is shown in FIG. 1, generally at 10. Referring to FIGS. 1-2B, the system 10 includes an autonomous driving system 12, which includes an autonomous driving (AD) controller 14 with vehicle trajectory (path) planning software functions 14A, various onboard sensors 16, and sensor fusion vehicle environmental model software 18 used for processing information from the sensors 16 and communicating the information to the autonomous driving trajectory planning software 14A. Both the vehicle trajectory (path) planning software functions 14A and sensor fusion vehicle environmental model software 18 are functions performed by the autonomous driving controller 14. The various onboard sensors 16 may be any types of various sensors or detection devices used for detecting information regarding the environment and objects around a vehicle 10A. These sensors 16 may include, but are not limited to, short range (SR) Radar, long range (LR) Radar, cameras, and lidar, and have a detection range around an area of the vehicle 10A.

The system 10 also includes a propulsion efficient path planning function 20, which is also in communication with the autonomous driving controller 14. The propulsion energy and efficiency path planning function 20 is also in communication with a propulsion control system 22, and a brake control system 24 of the vehicle 10A. The propulsion energy and efficiency path planning function 20 and propulsion control system 22 are part of a powertrain controller 26, and the powertrain controller 26 is in electrical communication with the AD controller 14 through propulsion efficient path planning function 20.

The propulsion control system 22 may provide control over various powertrain components, including, but not limited to, a drive actuator, such as a traction drive motor 22A, a high-voltage battery 22B, and a driveline component 22C, all of which combined with the powertrain controller 26 are part of the powertrain system of the vehicle 10A. The brake control system 24 includes a plurality of braking units 24A, however, it is within the scope of the invention that the powertrain components, such as the traction drive motor 22A and the driveline component 22C, may be used to produce negative torque to generate a braking force, and decrease the speed of the vehicle 10A. The efficiency of the powertrain components 22A-22C of the vehicle 10A currently and in the future (such as when the vehicle is travelling) is dependent on multiple factors including, but not limited to, traction drive torque limits (peak/continuous), battery system power or current limits, state-of-charge (including a maximum charge power/current limit and maximum discharge power/current limit), thermal management system operating point, powertrain operating state, etc.

The system 10 having the efficient autonomous driving strategy of the present invention expands the interface between the propulsion control system 22 of the vehicle 10A and the autonomous driving controller 14, such that data received by both the autonomous driving vehicle controller 14 and the powertrain controller 26 may be used to provide for a more efficient planning of the trajectory of the vehicle 10A, and potentially alters the trajectory of the vehicle 10A based on the efficiency of the powertrain components 22A-22C at both a current operating time, in addition to multiple points in time in the future, so that a requested autonomous driving maneuver may be completed in the most energy efficient manner.

The vehicle 10A also includes a steering control system 28, and the steering control system 28 along with the propulsion control system 22 and brake control system 24 are in communication with a vehicle motion arbitration control function 30, which is also part of the functionality of the autonomous driving controller 14. The arbitration control function 30 is what is used to transfer control back to the driver (in the case when autonomous driving is not allowed or enabled), shown generally at 32, based on input from the various sensors 16 of the vehicle 10A.

Referring again to FIGS. 1-2B, the propulsion efficient path planning function 20 of the present invention expands the interface between the powertrain system of the vehicle 10A and the autonomous driving system 12, such that data received by both the autonomous driving system 12 and the propulsion efficient path planning function 20 may be used to provide for a more accurate planning of the path of the vehicle 10A. If there is one or more possible vehicle trajectories for performing the autonomous driving maneuver (such that each possible vehicle trajectory corresponds to a level of efficiency and net energy consumption of the powertrain components 22A-22C) that may be used by the vehicle 10A to navigate an autonomous driving path, the vehicle trajectory chosen is the one having the most optimal efficiency and least energy consumption, based on efficiency of the powertrain components 22A-22C and the brake control system 24 at both a current operating time (t1), in addition to multiple points in time in the future (i.e., t2, t3, t4 . . . tY). The efficiency of the powertrain components 22A-22C of the vehicle 10A in the future (such as when the vehicle 10A is travelling) is calculated by the propulsion efficient path planning function 20, and is dependent on multiple factors including, but not limited to, traction drive torque and speed, torque limits (peak and continuous), battery system power/current limits, state-of-charge (SOC), cell temperature (including a maximum charge limit and maximum discharge limit), thermal management operating point, powertrain operating state, etc.

Figure 2A:
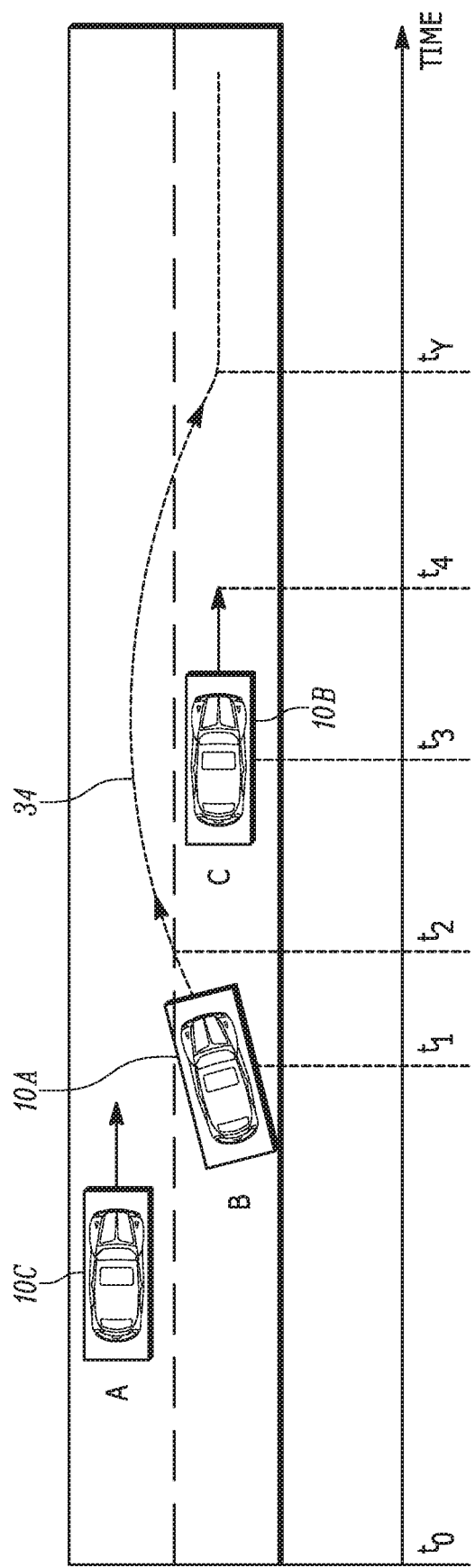
FIG. 2A is a diagram of an autonomous driving path for one vehicle passing another using an autonomous driving system which includes an efficient autonomous driving strategy, according to embodiments of the present invention.
Figure 2B:
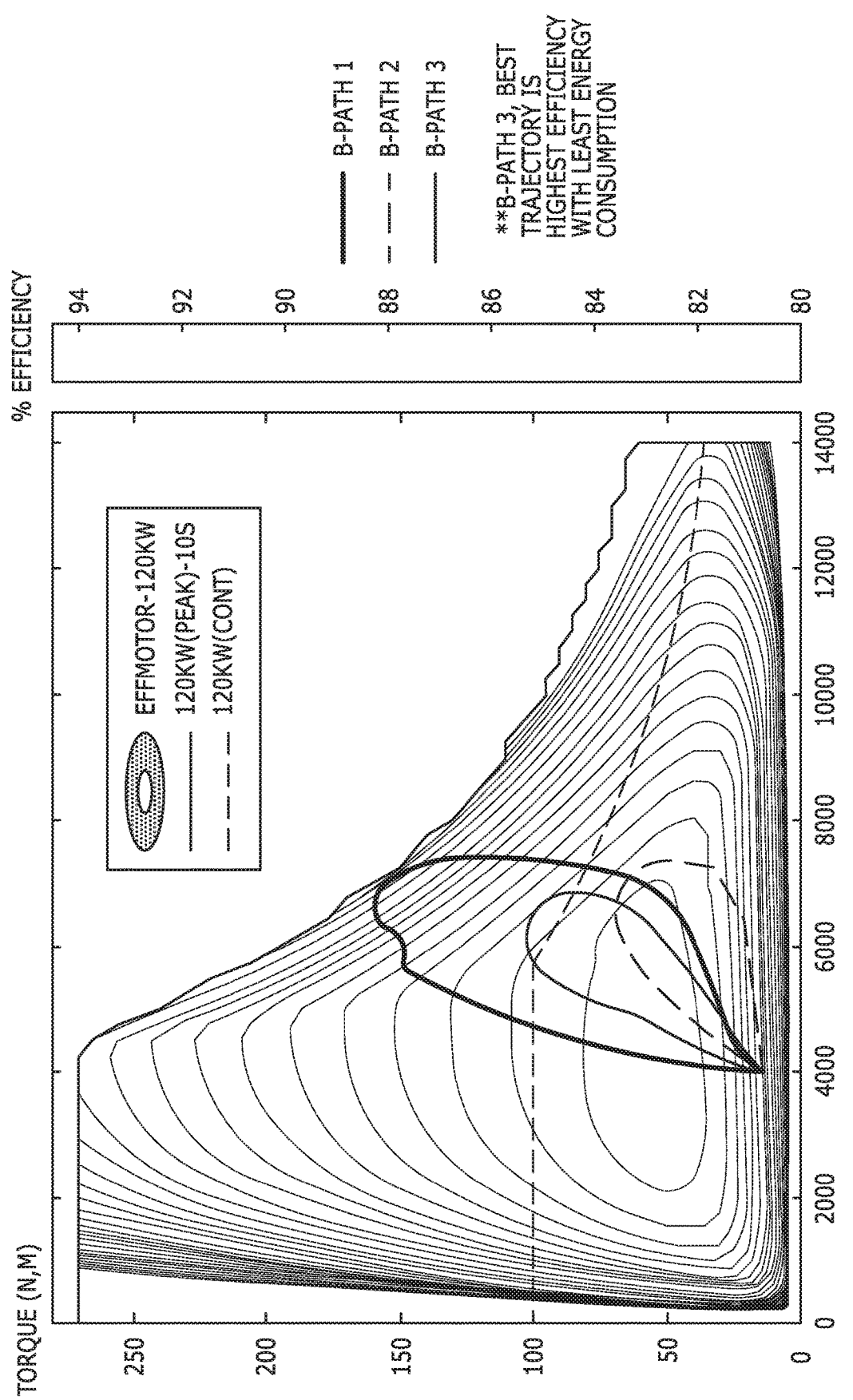
FIG. 2B is a diagram of various efficiencies of at least one powertrain component corresponding to several possible vehicle trajectories, where the efficiencies are calculated using an efficient autonomous driving strategy, according to embodiments of the present invention.

An example of the vehicle 10A performing an autonomous driving passing maneuver is shown in FIG. 2A, with the various corresponding operating efficiency characteristics of the traction drive motor 22A shown in FIG. 2B, with several possible efficiencies (as a function of torque and speed of the traction drive motor 22A) based on different possible vehicle trajectories that could be used to complete the autonomous driving passing maneuver shown in FIG. 2A. In FIG. 2A, the vehicle 10A is travelling the autonomous driving path 34 to perform the autonomous driving passing maneuver, such that the vehicle 10A passes the second vehicle 10B, prior to the approach of the third vehicle 10C.

The vehicle 10A initiates the passing maneuver at time t1. For each possible vehicle trajectory, the propulsion efficient path planning function 20 communicates the expected operating efficiency and total energy consumption of the powertrain components 22A-22C during the passing maneuver to the autonomous driving controller 14 not only at the current time (t1), but also for as many data points as required at a future time (i.e., t2, t3, t4 . . . tY) such that the total energy consumption and net efficiency for each possible vehicle trajectory that could be used to complete the passing maneuver is considered. Each possible vehicle trajectory may be represented by a plurality of data points representing the efficiency achievable and energy required using the propulsion control system 22 and brake control system 24 at the current time, and at as many points in time in the future as desired. The propulsion efficient path planning function 20 therefore provides the efficiency and energy consumption requirements of the powertrain components 22A-22C at the present time, and in the future to the autonomous driving controller 14 for each possible vehicle trajectory.

In the example shown in FIGS. 2A-2B, at time t1, the propulsion efficient path planning function 20 provides a first plurality of data points to the autonomous driving controller 14, where the first plurality of data points represents the efficiency of the powertrain components 22A-22C (for a specific vehicle trajectory) not only for the current time t1, but also the efficiency of the powertrain components 22A-22C for as many data points as desired in the future (i.e., t2, t3, t4 . . . tY). This process is repeated for all of the possible vehicle trajectories, such that there may be a second plurality of data points, a third plurality of data points, etc., such that the propulsion efficient path planning function 20 provides a plurality of data points to the autonomous driving controller representing the efficiency and total energy consumption required corresponding to each possible vehicle trajectory. Once the efficiency and energy consumption of the powertrain components 22A-22C has been calculated at the current time and each future time for all possible vehicle trajectories, the autonomous driving controller 14 selects the vehicle trajectory having the highest efficiency and least energy consumption to move along the autonomous driving path 34.

In addition to calculating the efficiency and energy consumption of the powertrain components 22A-22C corresponding to each possible vehicle trajectory prior to the vehicle 10A travelling the autonomous driving path 34, the propulsion efficient path planning function 20 is also able to calculate the optimal efficiency of the powertrain components 22A-22C as the vehicle 10A is travelling the autonomous driving path 34 and performing an autonomous driving maneuver. Referring again to the example in FIGS. 2A-2B, when the passing maneuver is being performed, and the time t2 becomes the current time, the propulsion efficient path planning function 20 provides another plurality of data points to the autonomous driving controller 14, where this additional plurality of data points represents the efficiency and energy consumption of the powertrain components 22A-22C for the current time t2 and the efficiency and energy consumption of the powertrain components 22A-22C for as many data points as desired in the future (i.e., t3, t4 . . . tY). This process is again repeated at time t2 for all of the possible vehicle trajectories, such that there are additional pluralities of data points representing the efficiency corresponding to each possible vehicle trajectory.

The propulsion efficient path planning function 20 therefore has the ability to update the autonomous driving controller 14 of the efficiency and energy consumption of the powertrain components 22A-22C at as many different points in time between t1 and tY as desired, and continuously update the autonomous driving controller 14 throughout the selected vehicle trajectory. The earlier that the efficiency and energy information of each of the powertrain components 22A-22C is provided to the autonomous driving controller 14, the more accurately and quickly the vehicle trajectory may be updated such that the powertrain components 22A-22C have the highest efficiency and least energy consumption as the vehicle 10A travels the autonomous driving path 34.

Therefore, as the efficiency of the powertrain components 22A-22C changes, the vehicle trajectory may be changed, or a different trajectory may be chosen, to optimize the efficiency of each of the powertrain components 22A-22C and reduce the total energy required to perform the autonomous driving passing maneuver. The current and predicted efficiency of the powertrain components 22A-22C for each possible vehicle trajectory may be recalculated as many times a needed as the vehicle 10A travels the autonomous driving path 34 to optimize the efficiency of the powertrain components 22A-22C. Referring again to the example shown in FIGS. 2A-2B, B-Path 3 is the most efficient and also uses the least total energy of the various possible vehicle trajectories that may be used for navigating the autonomous driving path 34 shown.

Figure 3:
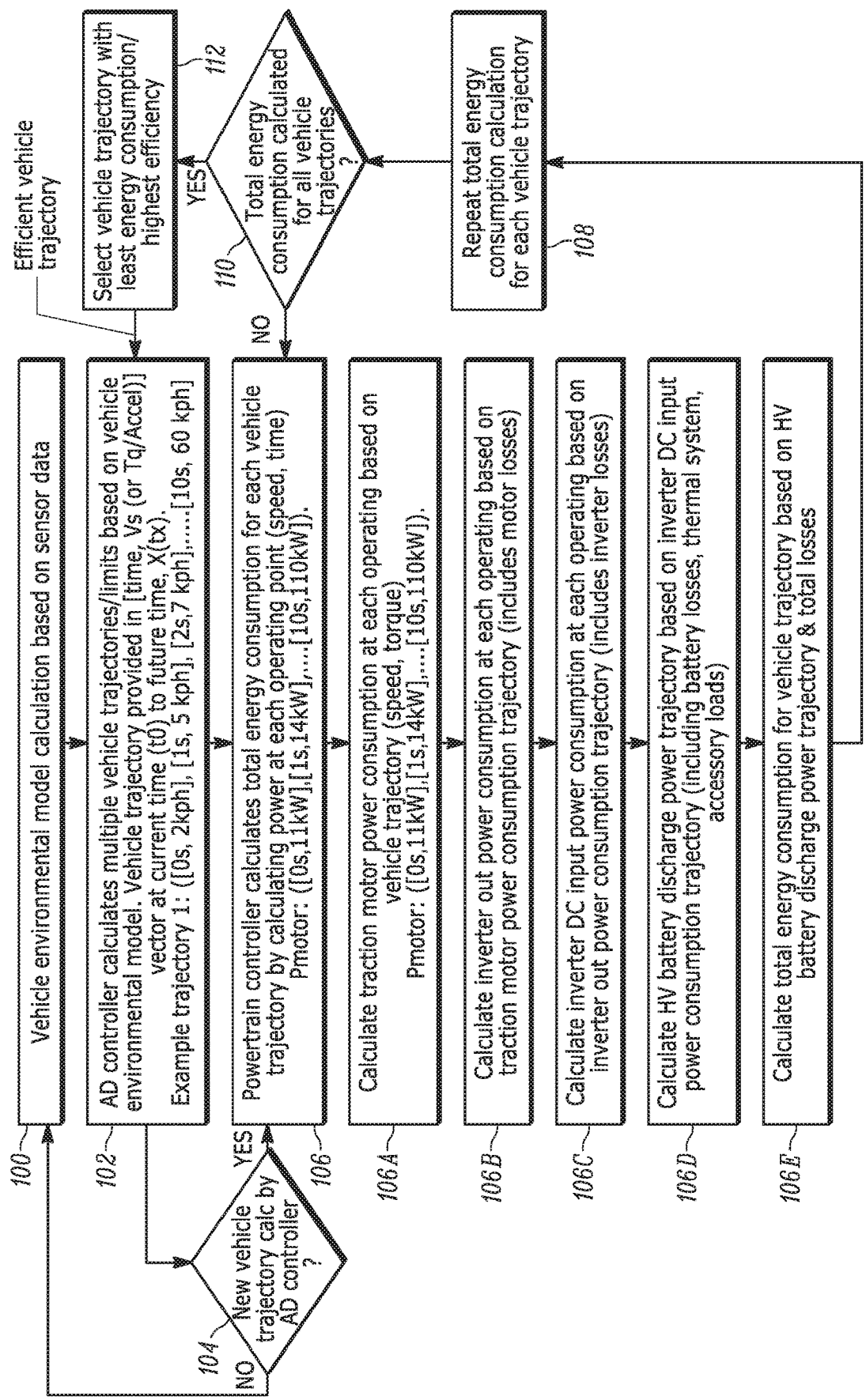
FIG. 3 is a flow chart demonstrating an example of the steps performed by a propulsion efficient path planning interface for generating an efficient autonomous driving strategy for a vehicle component, according to embodiments of the present invention.

The calculation for operational efficiency and energy consumption based on the limits of the powertrain components 22A-22C takes into account multiple factors including, but not limited to, traction drive limits (peak/continuous), battery system limits/state-of-charge (SOC), vehicle stability limits, powertrain operating state, etc. Referring to FIG. 3, a diagram is shown depicting an example of the steps taken to determine the most efficient vehicle trajectory prior to performing an autonomous driving maneuver, such as the lane passing maneuver shown in FIG. 2A, along with the operating characteristics of the vehicle 10A using the propulsion system efficient autonomous driving strategy. The diagram also includes the steps taken which involve adapting and changing the vehicle trajectory as the vehicle 10A navigates the autonomous driving path 34 based on any changes in the efficiency of the powertrain components 22A-22C.

At step 100, a vehicle environmental model is generated based on information received from the sensors 16 and the sensor fusion vehicle environmental model software 18. The vehicle environmental model is the information about the environment around the vehicle 10A, and any objects within the environment around the vehicle 10A. At step 102, multiple possible vehicle trajectories of the vehicle 10A and the corresponding operational limits of the powertrain components 22A-22C are calculated based on the vehicle environmental model calculated at step 100. At step 102, multiple vehicle trajectories and operational limits may be calculated by the autonomous driving controller 14 using various parameters, such as, but not limited to, velocity or torque (i.e., acceleration/deceleration), at both the current time (t1), and at some future time (such as t2, t3, t4 . . . tY shown in FIG. 2A). In the example shown at step 102 in FIG. 3, an example of one possible vehicle trajectory of the vehicle 10A (performing the autonomous driving passing maneuver in FIG. 2A) may be expressed as: ([0 seconds, 100 kph], [1 second, 110 kph], [2 seconds, 115 kph], . . . [10 seconds, 100 kph]), where t0 is 0 seconds, t1 is 1 second, t2 is 2 seconds, and tY is 10 seconds.

It should also be noted, that in the example shown in FIG. 2A, each possible vehicle trajectory could be expressed as a function of time and positive and negative acceleration. In the example shown at step 102 in FIG. 3, an example of one possible vehicle trajectory of the vehicle 10A may be expressed as: ([0 seconds, 0 m/s$^2$], [1 seconds, 3 m/s$^2$], [2 seconds, 5 m/s$^2$], . . . . [8 seconds −3 m/s$^2$], . . . [10 seconds, 0 m/s$^2$]). Each possible vehicle trajectory may be similarly be expressed as a function of time and required positive and negative torque.

After step 102, a determination is made at step 104 as to whether there is one or more new or additional vehicle trajectories. If there are no new vehicle trajectories, a new environmental model is calculated at step 100, and each of the new possible vehicle trajectories and operational limits (resulting from the new environmental model) are again calculated by the autonomous driving controller 14, such that both steps 100 and 102 are repeated.

If at step 104 it is determined that there are new possible vehicle trajectories, then at step 106, the operational efficiencies and energy consumptions of each of the powertrain components 22A-22C corresponding to each new possible vehicle trajectory is calculated. Each powertrain component 22A-22C consumes different amounts of energy, and therefore varies in efficiency, depending upon the chosen vehicle trajectory. The process of calculating the efficiencies of each of the powertrain components 22A-22C involves several sub-steps. In the example shown in FIG. 3, the power consumed from the battery 22B by the traction drive motor 22A corresponding to each of the possible vehicle trajectories is calculated.

In order to determine the power consumption of the battery 22B, at step 106A, the power consumption of each traction drive motor 22A corresponding to a first vehicle trajectory is initially calculated. Each traction drive motor 22A includes a power inverter (not shown), which is used to convert DC power from the battery 22B to AC power consumed by the traction drive motor 22A.

At step 106B, the power consumption out of the power inverter (used by the traction drive motor 22A) corresponding to the first vehicle trajectory is calculated. This power consumption calculation also takes into consideration losses from the traction drive motor 22A (or in the case of multiple traction drive motors being used, the calculation takes into account the losses from all of the traction drive motors).

Then, at step 106C, power consumption of the DC input (to the traction drive motor 22A) to the power inverter from the battery 22A corresponding to the first possible vehicle trajectory is calculated, where the calculation at step 106C also takes into account losses from the power inverter.

At step 106D, the discharge power consumption of the battery 22B corresponding to the first possible vehicle trajectory is calculated, based on DC input power consumption by the power inverter. The calculations for the discharge power consumption corresponding to the first possible vehicle trajectory at step 106D are calculated taking into account battery losses, thermal system operation, and accessory loads.

The total energy consumption for the first possible vehicle trajectory is then calculated at step 106E, based on the power consumption of the battery 22B and the total losses, including losses from the traction drive motor 22A, the power inverter, battery 22B, thermal system, and accessory loads.

At step 108, the process of calculating energy consumption for the battery 22B is repeated for each of the possible vehicle trajectories. To complete step 108, steps 106A-106E are repeated to calculate the efficiency and power consumption of the battery 22B corresponding to each of the possible vehicle trajectories. Similar steps are also taken to determine the power consumption and efficiency for the traction drive motor 22A and driveline component 22C, as well as any other desired powertrain components, corresponding to each possible vehicle trajectory.

After completion of step 108, a decision is made at step 110 as to whether the total energy consumption by the battery 22B has been calculated for each possible vehicle trajectory. If the total energy consumption has not been calculated for each possible vehicle trajectory, then steps 106-108 are repeated as many times as necessary until the energy consumption by the battery 22B corresponding to each possible vehicle trajectory has been calculated. However, if the total energy consumption by the battery 22B for each possible vehicle trajectory has been calculated, then step 112 is performed, where the vehicle trajectory which has the least energy consumption by the battery 22B is selected. Once the vehicle trajectory having the least energy consumption has been selected, steps 100-112 may be repeated (i.e., at times t2, t3, t4 . . . tY) as the vehicle 10A is traveling the autonomous driving path 34 to alter the vehicle trajectory, or choose a different vehicle trajectory, such that the powertrain components 22A-22C operate in the most efficient manner, with the lowest power consumption.

As previously mentioned, the propulsion efficient path planning function 20 is used to calculate the efficiency and energy consumption requirements of the powertrain components 22A-22C at the present time, and in the future for each possible vehicle trajectory. However, although the vehicle trajectory chosen to perform the autonomous driving maneuver may not be the most efficient, the vehicle trajectory chosen may result in one or more of the powertrain components 22A-22C operating with the least energy consumption. Referring again to FIG. 2B and the various efficiencies of the traction drive motor 22A, the efficiency of the traction drive motor 22A according to B-path 1 has a lower efficiency as compared to the efficiency of the traction drive motor 22A according to B-path 3. However, operating the traction drive motor 22A to have the efficiency of B-path 1 may result in lower energy consumption by the traction drive motor 22A, if the traction drive motor 22A is operated according to the efficiency of B-path 1 over a shorter period of time compared to the amount of time the traction drive motor 22A would be operated according to B-path 3 to perform the same autonomous driving maneuver.

Figure 4:
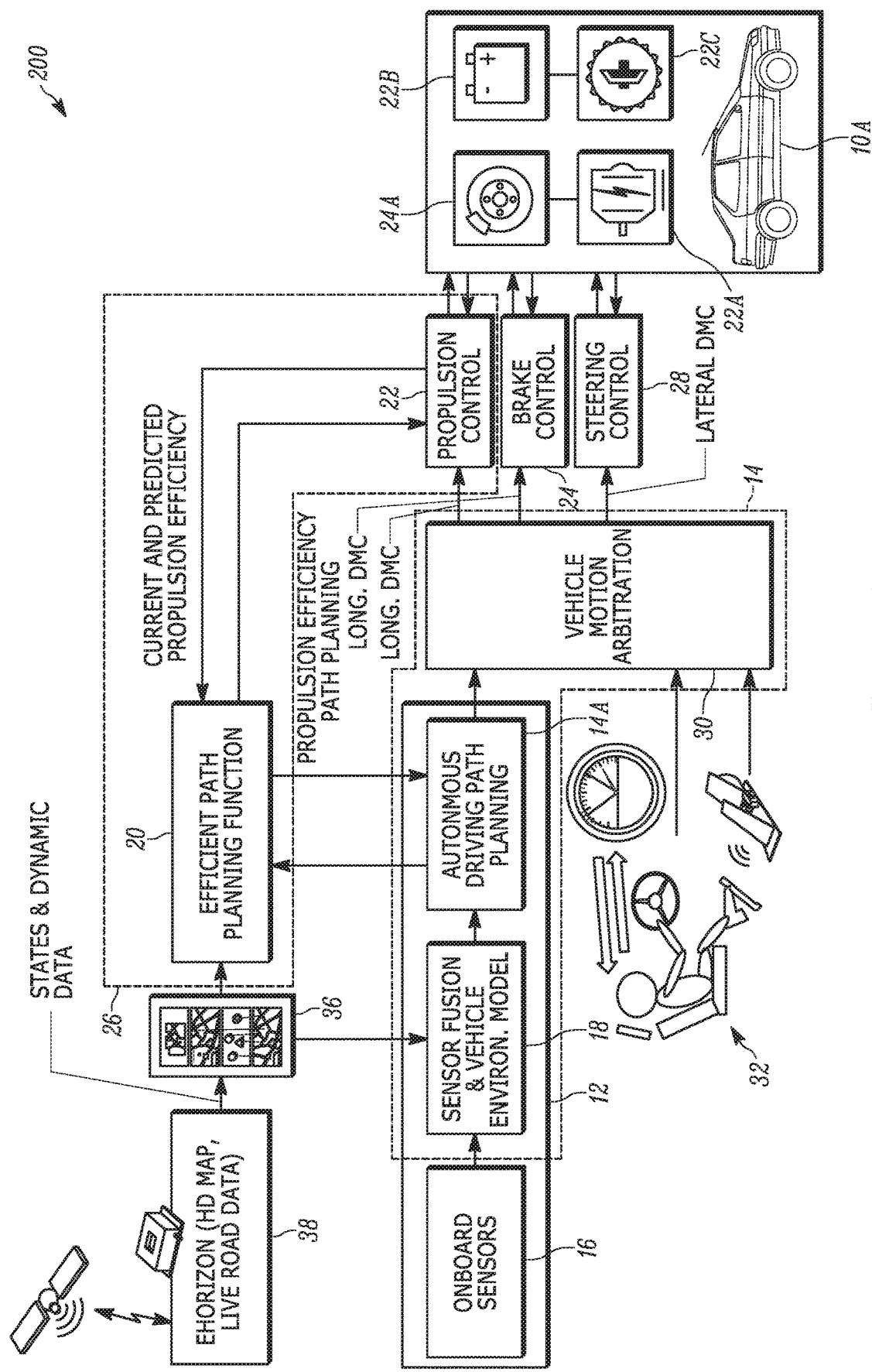
FIG. 4 is a diagram of an alternate embodiment of an autonomous driving system which includes an efficient autonomous driving strategy, according to embodiments of the present invention.
Figure 5:
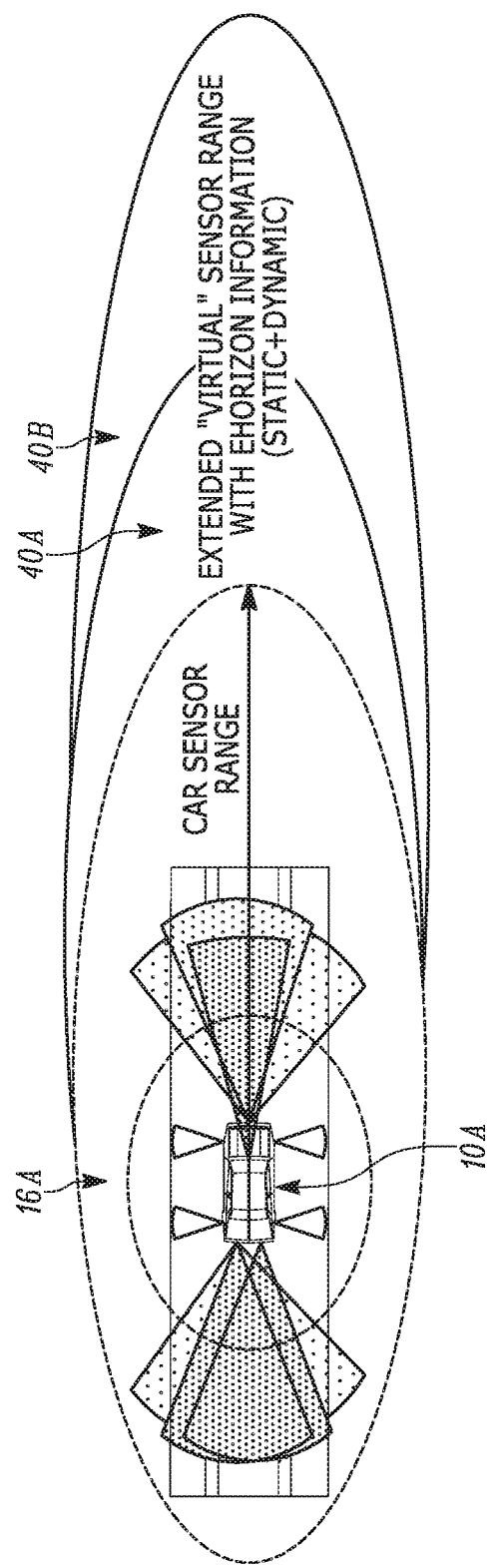
FIG. 5 is a diagram of a vehicle and the area around the vehicle where information is obtained by various sensor and telematics, where the vehicle includes an autonomous driving system which having an efficient autonomous driving strategy shown in FIG. 3, according to embodiments of the present invention.

An alternate embodiment of a system incorporating an efficient autonomous driving strategy according to the present invention is shown generally at 200 in FIG. 4, with like numbers referring to like elements. Referring generally to FIGS. 4-5, the sensor fusion software 18 also receives information such as road data (both static and dynamic) 36, which may originate from various devices 38, such as an advanced telematics system in communication with satellites, access to live road map data, and the like. In addition to the sensors 16 having a detection range 16A shown in FIG. 5, there are two additional detection areas, shown generally at 40A,40B, where information is obtained about the environment and objects in the environment using the various devices 38, such as, but not limited to, an advanced telematics system in communication with satellites, live road map data, and the like, to generate the different types of road data 36, as mentioned above. In the embodiment shown in FIGS. 4-5, the road data 36 is also sent to the propulsion efficient path planning function 20, and the road data 36 is also used in the determination of the power consumption and efficiency of each of the powertrain components 22A-22C for each possible vehicle trajectory. When the system 200 shown in FIG. 4 is used to calculate the various possible vehicle trajectories, such as during the various steps in the example shown in FIG. 3, the vehicle environmental model is calculated at step 100 in FIG. 3 based on the information received from the sensors 16 and the sensor fusion vehicle environmental model software 18, and the road data 36 received from the devices 38 and sensors 16. The remaining steps 102-112 are substantially similar.

In another alternate embodiment, there may be vehicle trajectory operational limits for the vehicle 10A, which may be specific to one or more autonomous driving maneuvers. These vehicle trajectory operational limits may include, but are not limited to, vehicle speed operating limits (both upper and lower limits), vehicle acceleration and deceleration limits, positive and negative vehicle torque limits, and the like. The vehicle trajectory operational limits are specified by the autonomous driving controller 14, and the propulsion efficient path planning function 20 then provides a vehicle trajectory to the autonomous driving controller 14, such that the vehicle 10A operates within vehicle trajectory operational limits, and the powertrain components 22A-22C operate with the least energy consumption at the present time, and in the future. The efficiency and energy consumption requirements of the powertrain components 22A-22C at the present time, and in the future are calculated taking into consideration the vehicle trajectory operational limits specified by the autonomous driving controller 14. Once the efficiency and energy consumption requirements are calculated by the propulsion efficient path planning function 20 (taking into consideration the vehicle trajectory operational limits specified by the autonomous driving controller 14), a vehicle trajectory is then generated such that the powertrain components 22A-22C have the least energy consumption, and corresponds to the vehicle 10A operating within the vehicle trajectory operational limits provided by the autonomous driving controller 14.

In other alternate embodiments, such as a conventional vehicle application, the powertrain system of the vehicle 10A may include an internal combustion engine, automatic multi-speed transmission with various gears, an additional driveline component such as a transfer gearbox case for provide all-wheel drive capability, etc. In yet another alternate embodiment, such as a hybrid electric vehicle, the powertrain system of the vehicle 10A may include both an electric traction drive system and internal combustion engine capable of providing vehicle propulsion or vehicle braking force through at least one drive axle and wheels. The hybrid electric vehicle powertrain system may also include multiple propulsion operating modes to provide series or parallel operation such that both electric traction drive and internal combustion may simultaneously provide vehicle propulsion or braking force.

The system 10,200 of the present invention may also include other features that may be incorporated into the prediction of the efficiency of the various powertrain components 22A-22C during autonomous driving maneuvers. In one alternate embodiment, the brake control system 24 of the vehicle 10A has regenerative braking capability, where brake units 24A are regenerative brakes which have regenerative braking limits due to vehicle stability/ESP (Electronic Stability Program). The regenerative braking limits may be included as part of the calculation for each of the possible vehicle trajectories. In another alternate embodiment, thermal management, powertrain operating state (engine on/off) etc. is also included. These predicted efficiencies of the various powertrain components 22A-22C (which may include the use of regenerative braking, thermal management, powertrain operating state, etc.) may be calculated at time t1 for the current time, and at one or more points in time in the future tY, based on the target acceleration/speed trajectory for the path plan of the vehicle 10A provided by the autonomous driving controller 14. This approach for both vehicle acceleration and deceleration capability from the powertrain components 22A-22C is based on current and future energy demand or recuperation. There are different algorithms and variants to this strategy. For example, if the vehicle 10A included additional connectivity which provided static and dynamic data, such as, but not limited to, road grade, vehicle environment, road surface, traffic flow or even traffic timing information, this information may also be included in the limit calculations for predictive efficiency of the powertrain components 22A-22C of the vehicle 10A. One example of the implantation of static and dynamic data is the situation where a future road grade is known which would lead to increased thermal management loading for the powertrain components 22A-22C, this additional energy demand requirement would be predicatively accounted for in the calculations for efficiency and power consumption earlier in time and accounted for given a vehicle trajectory.

In addition to the features discussed above, the system 10 having the efficient autonomous driving strategy of the present invention may also be used to not only alter the selected vehicle trajectory, but also modify the driving path 34 or modify how the autonomous driving maneuver is performed to optimize the efficiency of the powertrain components 22A-22C as well. For example, if the vehicle 10A is an electric or hybrid-electric vehicle, the driving path 34 or autonomous driving maneuver may be modified to optimize the efficiency of the traction drive motor 22A, power inverter (not shown), high voltage battery system 22B, etc.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A system having an efficient autonomous driving strategy, comprising:
   an autonomous driving controller operable for configuring a vehicle to perform at least one autonomous driving maneuver;
   a plurality of vehicle trajectories, the autonomous driving controller operable for configuring the vehicle to perform the at least one autonomous driving maneuver using one of the plurality of vehicle trajectories;
   at least one powertrain component;
   an efficient propulsion path planning function in electrical communication with the autonomous driving controller and the at least one powertrain component, the efficient propulsion path planning function being operable for calculating the energy consumption of the at least one powertrain component corresponding to each of the plurality of vehicle trajectories;
   a current time, the autonomous driving controller calculates each of the plurality of vehicle trajectories at the current time; and
   at least one future time, the autonomous driving controller calculates each of the plurality of vehicle trajectories at the at least one future time;
   wherein the autonomous driving controller configures the vehicle to perform the at least one autonomous driving maneuver using one of the plurality of vehicle trajectories corresponding to the most energy efficient use of the at least one powertrain component, and the autonomous driving controller selects one of the plurality of vehicle trajectories to perform the at least one autonomous driving maneuver which corresponds to the at least one powertrain component operating using the least energy at both the current time and the at least one future time.

2. The system having an efficient autonomous driving strategy of claim 1, further comprising:
   a first plurality of data points, one or more of the first plurality of data points representing the efficiency and energy consumption of the at least one powertrain component at the current time, and another of the first plurality of data points representing the efficiency and energy consumption of the at least one powertrain component at the at least one future time;
   wherein the autonomous driving controller configures the vehicle to perform the at least one autonomous driving maneuver using the at least one powertrain component based on the first plurality of data points at both the current time and the at least one future time.

3. The system having an efficient autonomous driving strategy of claim 1, wherein the efficiency and energy consumption of the at least one powertrain component corresponding to each of the plurality of vehicle trajectories is recalculated by the efficient propulsion path planning function as the vehicle performs the at least one autonomous driving maneuver.

4. The system having an efficient autonomous driving strategy of claim 3, wherein the one of the plurality of vehicle trajectories is altered during the at least one autonomous driving maneuver based on the recalculated efficiency and energy consumption of the at least one powertrain component.

5. The system having an efficient autonomous driving strategy of claim 1, further comprising a vehicle environmental model, wherein each of the plurality of vehicle trajectories is calculated using the vehicle environmental model.

6. The system having an efficient autonomous driving strategy of claim 1, further comprising:
a plurality of sensors for detecting information regarding the environment and objects around the vehicle, the plurality of sensors in electrical communication with the autonomous driving controller; and
sensor fusion vehicle environmental model software in electrical communication with the autonomous driving controller;
wherein the vehicle environmental model is generated by the sensor fusion vehicle environmental model software based on information received from the plurality of sensors.

7. The system having an efficient autonomous driving strategy of claim 6, further comprising:
at least one device for generating road data;
wherein the vehicle environmental model is generated by the sensor fusion vehicle environmental model software based on the road data and information received from the plurality of sensors.

8. The system having an efficient autonomous driving strategy of claim 1, further comprising at least one battery, wherein the one of the plurality of vehicle trajectories is selected to perform the at least one autonomous driving maneuver based on the at least one powertrain component using the lowest energy consumption from the at least one battery.

9. The system having an efficient autonomous driving strategy of claim 1, wherein the at least one powertrain component is one selected from the group consisting of a drive actuator, a traction drive motor, a battery energy storage system, and an internal combustion engine.

10. The system having an efficient autonomous driving strategy of claim 1, further comprising a brake control system in electrical communication with the efficient propulsion path planning function, wherein the calculated efficiency and energy consumption of the at least one powertrain component corresponding to each of the plurality of vehicle trajectories is optimized based on the operation of the brake control system.

11. The system having an efficient autonomous driving strategy of claim 1, further comprising a powertrain controller, wherein the efficient propulsion path planning function is performed by the powertrain controller.

12. The system having an efficient autonomous driving strategy of claim 1, wherein each of the plurality of vehicle trajectories is expressed as a function of one selected from the group consisting of time and speed, time and acceleration, and time and torque.

13. A method for navigating an autonomous driving vehicle in the most energy efficient manner, comprising the steps of:
providing a current time;
providing at least one future time;
providing a vehicle environmental model;
providing at least one powertrain component having a plurality of efficiencies and a plurality of energy consumptions;
providing a plurality of vehicle trajectories, where each of the plurality of efficiencies and the plurality of energy consumptions of the at least one powertrain component corresponds to one of the plurality of vehicle trajectories;
calculating each of the plurality of vehicle trajectories based on the vehicle environmental model at both the current time and the at least one future time;
calculating each of the plurality of efficiencies of the at least one powertrain component at both the current time at the at least one future time;
calculating each of the plurality of energy consumptions of the at least one powertrain component at both the current time at the at least one future time;
selecting a first of the plurality of vehicle trajectories which corresponds to the at least one powertrain component operating with the most energy efficient of the plurality of efficiencies and the plurality of energy consumptions;
using the first of the plurality of vehicle trajectories to perform an autonomous driving maneuver.

14. The method of claim 13, further comprising the steps of:
providing an efficient propulsion path planning function;
calculating each of the plurality of efficiencies with the efficient propulsion path planning function;
calculating each of the plurality of energy consumptions with the efficient propulsion path planning function.

15. The method of claim 13, further comprising the steps of:
providing an autonomous driving controller in electrical communication with the efficient propulsion path planning function;
using the autonomous driving controller for configuring the vehicle to perform the autonomous driving maneuver based on the first of the plurality of vehicle trajectories.

16. The method of claim 13, further comprising the steps of:
providing a first plurality of data points representing the efficiency and the energy consumption of the at least one powertrain component when the vehicle is traversing one of the plurality of vehicle trajectories;
representing the efficiency and the energy consumption of the at least one powertrain component at the current time using at least one of the first plurality of data points;
representing the efficiency and the energy consumption of the at least one powertrain component at the at least one future time using another of the first plurality of data points;
configuring the vehicle to perform the at least one autonomous driving maneuver using the at least one powertrain component based on the first plurality of data points at both the current time and the at least one future time.

17. The method of claim 13, further comprising the steps of:
    determining if there is an additional vehicle trajectory requested in addition to the plurality of vehicle trajectories;
    recalculating the vehicle environmental model;
    calculating the efficiency and energy consumption of the at least one powertrain component corresponding to the additional vehicle trajectory;
    selecting either the additional vehicle trajectory or one of the plurality of vehicle trajectories corresponding to the at least one powertrain component operating in the most energy efficient manner to perform the autonomous driving maneuver.

18. The method of claim 13, further comprising the steps of selecting the at least one powertrain component from the group consisting of a drive actuator, a traction drive motor, an energy storage system, and an internal combustion engine.

19. The method of claim 13, further comprising the steps of:
    providing at least one battery; and
    selecting one of the plurality of vehicle trajectories based on the at least one powertrain component using the lowest energy consumption from the at least one battery.

20. The method of claim 13, further comprising the steps of:
    recalculating the vehicle environmental model as the vehicle performs the at least one autonomous driving maneuver;
    recalculating each of the plurality of vehicle trajectories based on the vehicle environmental model as the vehicle performs the at least one autonomous driving maneuver;
    recalculating each of the plurality of efficiencies of the at least one powertrain component corresponding to each of the plurality of vehicle trajectories as the vehicle performs the at least one autonomous driving maneuver;
    recalculating each of the plurality of energy consumptions of the at least one powertrain component corresponding to each of the plurality of vehicle trajectories as the vehicle performs the at least one autonomous driving maneuver.

21. The method of claim 20, further comprising the steps of altering the first of the plurality of vehicle trajectories during the at least one autonomous driving maneuver based on a change in the efficiency and a change in the energy consumption of the at least one powertrain component.

22. The method of claim 20, further comprising the steps of selecting a second of the plurality of vehicle trajectories during the at least one autonomous driving maneuver based on a change in the efficiency and a change in the energy consumption of the at least one powertrain component.

23. The method of claim 13, further comprising the steps of:
    providing a plurality of sensors;
    providing sensor fusion vehicle environmental model software;
    generating the vehicle environmental model based on information received from the plurality of sensors and the vehicle environmental model software.

24. The method of claim 23, further comprising the steps of:
    providing at least one device for generating road data;
    generating the vehicle environmental model with the sensor fusion vehicle environmental model software based on the road data and information received from the plurality of sensors.

25. The method of claim 13, further comprising the steps of:
    providing a brake control system in electrical communication with the autonomous driving controller;
    calculating the plurality of efficiencies of the at least one powertrain component corresponding to each of the plurality of vehicle trajectories based on the operation of the brake control system.

26. The method of claim 13, further comprising the steps of calculating each of the plurality of vehicle trajectories as a function of one selected from the group consisting of time and speed, time and acceleration, and time and torque.

* * * * *